May 23, 1933. P. W. DEMPSEY 1,910,526
MOLD FOR FLAT PACKING
Filed Dec. 2, 1929
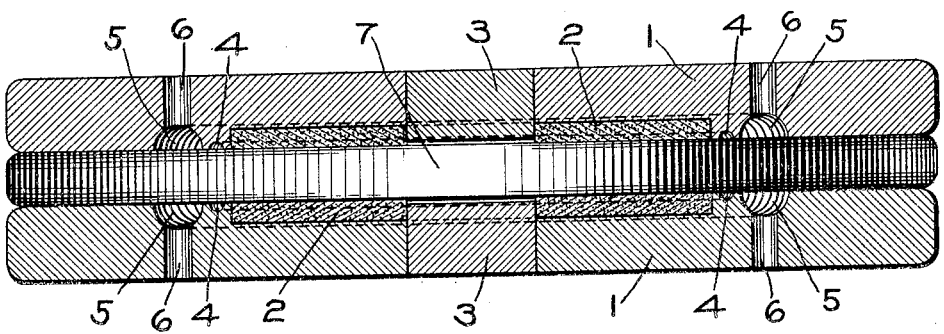
INVENTOR
PHILIP W. DEMPSEY
BY *Wm. H. Cady*
ATTORNEY Patented May 23, 1933

1,910,526

UNITED STATES PATENT OFFICE

PHILIP W. DEMPSEY, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

MOLD FOR FLAT PACKING

Application filed December 2, 1929. Serial No. 410,969.

This invention relates to packing molds, and more particularly to a mold for flat packing.

One object of my invention is to provide a mold for packing having means for disposing of excess material flowing from the packing when the packing is being pressed in the mold, so as to provide a more uniform packing.

Another object of the invention is to provide an improved method of handling the molds, so as to facilitate and reduce the cost of making molded packing.

Other objects and advantages will appear in the following more detailed description of the invention.

In the accompanying drawing, the single figure is a central sectional view of a packing mold assembly embodying my invention.

Each mold may comprise a plate 1, preferably of heat-treated steel, provided at one face with a recess corresponding with the contour of the packing 2, such as a circular contour. If the packing has a central opening, the plate 1 is provided with a central bore in which a plug 3 is secured, said plug being adapted to extend into the opening of the packing 2.

Adjacent to the periphery of the recess containing the packing, the plate 1 is provided on its face with a shallow annular groove 4 and adjacent to the groove 4 a larger annular groove 5 is provided. A plurality of atmospheric vent openings 6 extend through the plate from the groove 5.

A plate 7, preferably of hardened tool steel is also provided, and in operation, the roughly formed packing 2 is placed in the mold 1, and the plate 7 is then applied to the face of the mold. Another mold 1 with a packing 2 disposed therein is then applied inverted, to the upper face of the plate 7, in the manner shown in the drawing.

The assembly of molds is then placed in a suitable press (not shown) and pressure is applied to the molds, so as to press the packings in the molds. Excess material flowing from the packings in the molds, flows into the shallow grooves 4, and if the shallow grooves should become filled with excess material, further excess flows into the larger grooves 5.

Any gas produced in the packing when the molds are subjected to pressure, can escape by way of the vent passages 6.

Where the packing is relatively small, each mold may be provided with a number of recesses to receive a corresponding number of packings, as will be evident.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

A mold for packing comprising a plate having a recess in one face to receive the packing, a shallow annular groove in said face adjacent to the periphery of said recess and another annular groove in said face, adjacent to the shallow groove.

In testimony whereof I have hereunto set my hand, this 27th day of November, 1929.

PHILIP W. DEMPSEY.